(12) United States Patent
Ringland et al.

(10) Patent No.: US 8,718,670 B2
(45) Date of Patent: May 6, 2014

(54) METHOD OF TRANSMITTING DATA TO A MOBILE DEVICE

(75) Inventors: Simon P A Ringland, Suffolk (GB); Benjamin Bappu, Suffolk (GB); Matthew D Walker, Suffolk (GB)

(73) Assignee: BRITSIH TELECOMMUNICATIONS public limited company, London (GB)

( * ) Notice: Subject to any disclaimer, the term of this patent is extended or adjusted under 35 U.S.C. 154(b) by 1161 days.

(21) Appl. No.: 12/530,371

(22) PCT Filed: Mar. 7, 2008

(86) PCT No.: PCT/GB2008/000819
§ 371 (c)(1), (2), (4) Date: Sep. 8, 2009

(87) PCT Pub. No.: WO2008/107697
PCT Pub. Date: Sep. 12, 2008

(65) Prior Publication Data
US 2010/0085947 A1  Apr. 8, 2010

(30) Foreign Application Priority Data
Mar. 7, 2007  (EP) .................................... 07250943

(51) Int. Cl.
*H04W 24/00* (2009.01)

(52) U.S. Cl.
USPC ........................................ 455/456.1; 455/446

(58) Field of Classification Search
USPC ........ 455/456.1, 446, 86, 84, 73, 75, 78, 428, 455/432.1, 433; 370/338, 352; 709/218, 709/232, 203, 231; 703/2; 375/261, 272, 375/219, 275, 295, 303, 307, 334, 335
See application file for complete search history.

(56) References Cited

U.S. PATENT DOCUMENTS 7,129,932 B1  10/2006  Klarlund et al.
2003/0212760 A1 * 11/2003 Chen et al. ............... 709/218
(Continued)

FOREIGN PATENT DOCUMENTS

| EP | 1 549 096 | 6/2005 |
| EP | 1 737 160 | 12/2006 |
| GB | 2 387 074 | 10/2003 |
| WO | WO 2004/062122 | 7/2004 |

OTHER PUBLICATIONS

International Search Report for PCT/GB2008/000819, mailed Jun. 16, 2008.
(Continued)

*Primary Examiner* — Charles Appiah
*Assistant Examiner* — Alexander Yi
(74) *Attorney, Agent, or Firm* — Nixon & Vanderhye P.C.

(57) ABSTRACT

A system for transmitting data via a core portion of a computer network to a mobile device is described. The network includes a plurality of access points wherein each access point includes a memory where data for onward transmission to the mobile device may be cached and is operable to communicate with the mobile device over a short-range wireless connection, when the mobile device is in range thereof, and with the core portion of the network over a backhaul connection on a substantially continuous basis. The exemplary system includes: a location collection server for receiving location data from the mobile device; an access point prediction engine for generating predictions of one or more of the access points which the mobile device is considered likely to come in range of in the future based on recent location data received at the location collection server; and a content delivery server for transmitting the data or a portion thereof to the one or more predicted access points via the backhaul connection for caching at the access points and for onward transmission to the mobile device in the event that the mobile device comes into range of the access point, or one or more of the access points where data is transmitted to more than one predicted access point.

10 Claims, 5 Drawing Sheets

(56) References Cited

U.S. PATENT DOCUMENTS

2004/0174865 A1* 9/2004 O'Neill ......................... 370/352
2004/0192342 A1* 9/2004 Ranganathan ............. 455/456.1
2005/0271008 A1  12/2005 Gallagher et al.
2006/0069800 A1* 3/2006 Li ................................. 709/232

OTHER PUBLICATIONS

Written Opinion of the International Searching Authority for PCT/GB2008/000819 mailed Jun. 16, 2008.

Kanter et al., "Rethinking Wireless Internet with Smart Media," Proc. Nordic Radio Symp, 2001, 3 pages.

Marmasse et al., "A User-Centered Location Model," Personal and Ubiquitous Computing, 2002, vol. 6, pp. 318-321.

Laasonen, "Route Prediction from Cellular Data," Proceedings of the workshop on Context Awareness for Proactive Systems, Helsinki, Finland, 2005, 10 pages.

Kanter, "Adaptive Personal Mobile Communication Service Architecture and Protocols," Laboratory of Communication Networks, Department of Microelectronics and Information Technology, Royal Institute of Technology, Nov. 2001.

* cited by examiner

METHOD OF TRANSMITTING DATA TO A MOBILE DEVICE

This application is the U.S. national phase of International Application No. PCT/GB2008/000819 filed 7 Mar. 2008, which designated the U.S. and claims priority to Europe Application No. 07250943.3 filed 7 Mar. 2007, the entire contents of each of which are hereby incorporated by reference.

BACKGROUND

1. Technical Field

The present invention relates to a method and apparatus for transmitting data (for example multi-media content) to a mobile device, especially via one or more Wireless Local Area Network (WLAN) Access Points (AP's) connected to a central wired network.

2. Related Art

The Institute of Electrical and Electronic Engineers (IEEE) has developed a series of standards all of which commence with 802.11 and which are commonly known collectively as the 802.11 standards (or more informally as the 802.11x standards). Technically, the IEEE consider that there is only the one 802.11 standard (which is often referred to as the legacy standard) and then there are multiple amendments to the standard (e.g. amendment 802.11g, 802.11a, 802.11b, 802.11n, 802.11i, etc.) although in practice several of these "amendments" (e.g. 802.11g, 802.11a, 802.11b and the not-yet finalised 802.11n) are typically viewed by persons skilled in the art as separate standards in their own right. These are the standards most commonly used to implement WLAN's and so the term WLAN is generally used to refer to a WLAN formed using 802.11 technology. Additionally, the term Wi-Fi (which is a registered trade mark of the Wi-Fi Alliance) is in common popular usage and designates WLAN products and services which have been certified by the Wi-Fi Alliance as operating in accordance with the 802.11 standards. Devices which operate according to any of these standards are known as WLAN-enabled devices (or, where applicable, as Wi-Fi enabled devices) and portable consumer devices are increasingly becoming WLAN enabled.

The WLAN connection enables a WLAN enabled mobile device to download (or upload) data at rates of up to 54 Mbits/s (for the 802.11a or 802.11g amendments to the 802.11 legacy standard—subsequent standards/amendments such as the 802.11n amendment will allow even greater maximum data rates) from an "access point" via a wireless transmission protocol. The access point is a (generally fixed) device which has a (normally) wired connection to a central network via an Internet Service Provider. The wired connection is generally through some sort of access network and is usually referred to as a backhaul connection. In many cases the backhaul will be via a Digital Subscriber Line (xDSL) connection such as an Asynchronous DSL (ADSL) connection. As more and more WLAN access points are set up, the use of WLAN (especially using the 802.11 standards) as a mechanism for delivering data to mobile devices becomes more and more attractive as a general proposition, either as the sole means of delivering the content or as an augmentation to data delivered via other means such as GPRS over a cellular network.

BRIEF SUMMARY

In networks comprising a central wired network having multiple WLAN access points, it is often the case that the wireless connection between an access point and a mobile device has a much greater bandwidth than the connection between the access point and the wired network (the "backhaul"). The present invention seeks to provide a mechanism for minimising the bottleneck effect of a relatively slow backhaul connection.

According to a first aspect of the present invention, there is provided a method of transmitting data from a core portion of a computer network to a mobile device, the network including a plurality of access points wherein each access point includes a memory where data for onward transmission to the mobile device may be cached and is operable to communicate with the mobile device over a short-range connection, when the mobile device is in range thereof, and with the network over a backhaul connection to the core portion of the network, the method comprising obtaining location data from the mobile device, generating predictions of one or more of the access points which the mobile device is considered likely to come in range of in the future, and transmitting the data or a portion thereof to the one or more predicted access points via the backhaul connection for caching thereat and for onward transmission to the mobile device in the event that the mobile device comes into range of the access point, or one or more of the access points where data is transmitted to more than one predicted access point, wherein the generation of predictions is performed using an n-gram language model.

In this way, provided the predictions are not completely inaccurate, it is possible to download much more data to a wireless enabled device using the large bandwidth available between the mobile station and an Access Point, even when the device is in motion past an Access Point and therefore only in range for a short time, than would be possible if none of the desired data was pre-cached at the Access Point since in that case the amount of data which could be transmitted while the device is in range of the access point would be limited by the bandwidth available over the backhaul connection from the access point, as opposed to the much higher bandwidth typically available between a mobile device and the access point when they are in range of one another.

The use of an n-gram language model is very advantageous in the present application (despite not generally being used outside language processing/understanding applications) because it is a model which is easy to build up based on limited observations' and which enables many different underlying mechanisms to be successfully accounted for. Many known systems rely on calculating a movement vector based on earlier observations of a single device and extrapolating from this to estimate a predicted trajectory of the device and then to estimate which access points may come in range of the device while it travels along this trajectory. However, user's journeys are rarely at a constant velocity (i.e. in a straight line at a constant speed), at least not for any great length of time, and so this method is generally very bad at making predictions over extended time periods. By contrast, the n-gram language model does not assume any particular underlying mechanism (i.e. that the device is moving in a constant velocity trajectory). Furthermore, it is able to combine information from a number of different observations from different devices and combine the in a sophisticated manner. it is therefore, surprisingly, optimally suited to use in predicting subsequent access points that a device will come into contact with based only on observations of the timings of previous periods of being within range of an access point or points.

The details of n-gram models and how they may be applied to the present invention are set out in the specific description below, but in general, an n-gram language model as the term is used in the present application refers to a statistical model in which the probabilities of transitions from one state of the device (which is preferably simply correlated with an access point to which the device is in communication but may include additional factors or characteristics such as day of the week, time of day, etc.) to another (and preferably also the probabilities of the timings associated with such transitions) based on one or more previous transitions or states of the device (i.e. the conditional probabilities of transitioning from one state to another given one or more previous transitions or states) are determined from observations of historical behaviour and then used to predict future possible states (and hence access points within range of which the device may subsequently come).

Note that the use of an n-gram language model can be thought of as providing a mechanism for trying to infer how certain observable variables may change based on an underlying mechanism (representable in terms of certain "hidden variables") which may be very complex (e.g. natural languages in the normal case, or, in the present invention, human movements). By analogising the movements of users with the a complex natural language and the observable states of the access points with which a device comes into contact with the words in a human language (or phonemes in a human's speech) etc. it becomes apparent that an n-gram language model is an appropriate mechanism to use.

Preferably, the method includes one or more of the additional steps of dividing the data to be transmitted into a plurality of blocks of data, predicting the time at which the mobile device will come in range of a specified access point, and the duration for which the mobile device will stay in range of the access point, determining an estimate of the number of the blocks to be transmitted that can both be transmitted over the backhaul and onward transmitted over the short-range connection before the mobile device is predicted to move back out of range of the access point, and transmitting the estimated remainder of the blocks to one or more additional ones of the access points which the device is considered likely to come in range of after moving back out of range of the specified access point.

According to a second aspect of the present invention, there is provided a system as set out in appended claim 6.

Further aspects of the present invention relate to a content delivery server, an access point prediction engine, an access point and a mobile station for use in the system of the second aspect of the present invention and to computer programs for implementing the method of the first aspect of the invention.

BRIEF DESCRIPTION OF THE FIGURES

In order that the present invention may be better understood, embodiments thereof will now be described, by way of example only, with reference to the accompanying drawings in which.

DETAILED DESCRIPTION OF EXEMPLARY EMBODIMENTS

Figure 1:
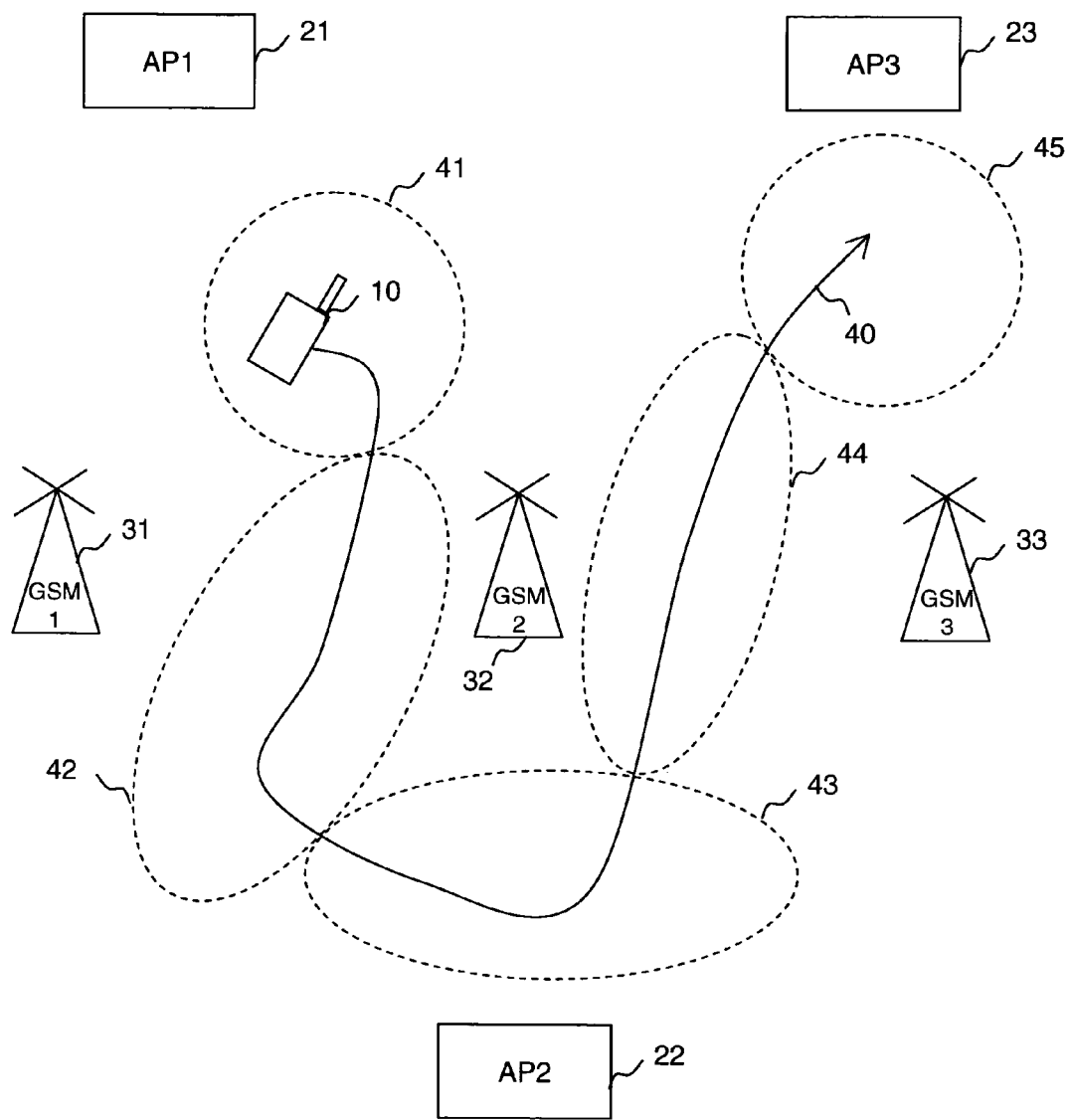
FIG. 1 is a block diagram of a mobile WLAN enabled device operating in an example terrain, the terrain including a plurality of WLAN access points and a plurality of GSM base stations, within which the method of the present invention may be practised.

FIG. 1 schematically illustrates a typical terrain to which a first embodiment of the present invention applies. The terrain includes first, second and third Access Points (AP's) 21, 22, 23—namely AP1, 21, AP2, 22, and AP3, 23—and first, second and third GSM base stations 31, 32; 33—namely GSM1, 31, GSM2, 32, and GSM3, 33. FIG. 1 also depicts a mobile device and an example path 40 (the dashed, arrowed line 40) followed by the device through the terrain, together with five regions 41-45 (illustrated by the dotted lines 41-45) through which the device's path 40 travels.

In the present embodiment, the device 10 is a WLAN enabled cellular device which is able to communicate using GSM as well as 802.11 WLAN protocols via GSM base stations 31-33 and WLAN AP's 21-23 respectively, when in range.

In the first region 41, the device 10 is within range of, and therefore able to communicate with, AP1 21, GSM1 31 and GSM2 32.

In the second region 42, the device 10 is within range of GSM1 31 and GSM2 32 (but now out of range of AP1).

In the third region 43, the device 10 is within range of GSM1 31, GSM2 32, GSM3 33 and AP2 22.

In the fourth region 44, the device 10 is within range of GSM2 32 and GSM3 33 (but now out of range of AP2 and GSM1).

In the fifth region 45, the device 10 is within range of GSM2 32, GSM3 33 and AP3 23.

Figure 2:
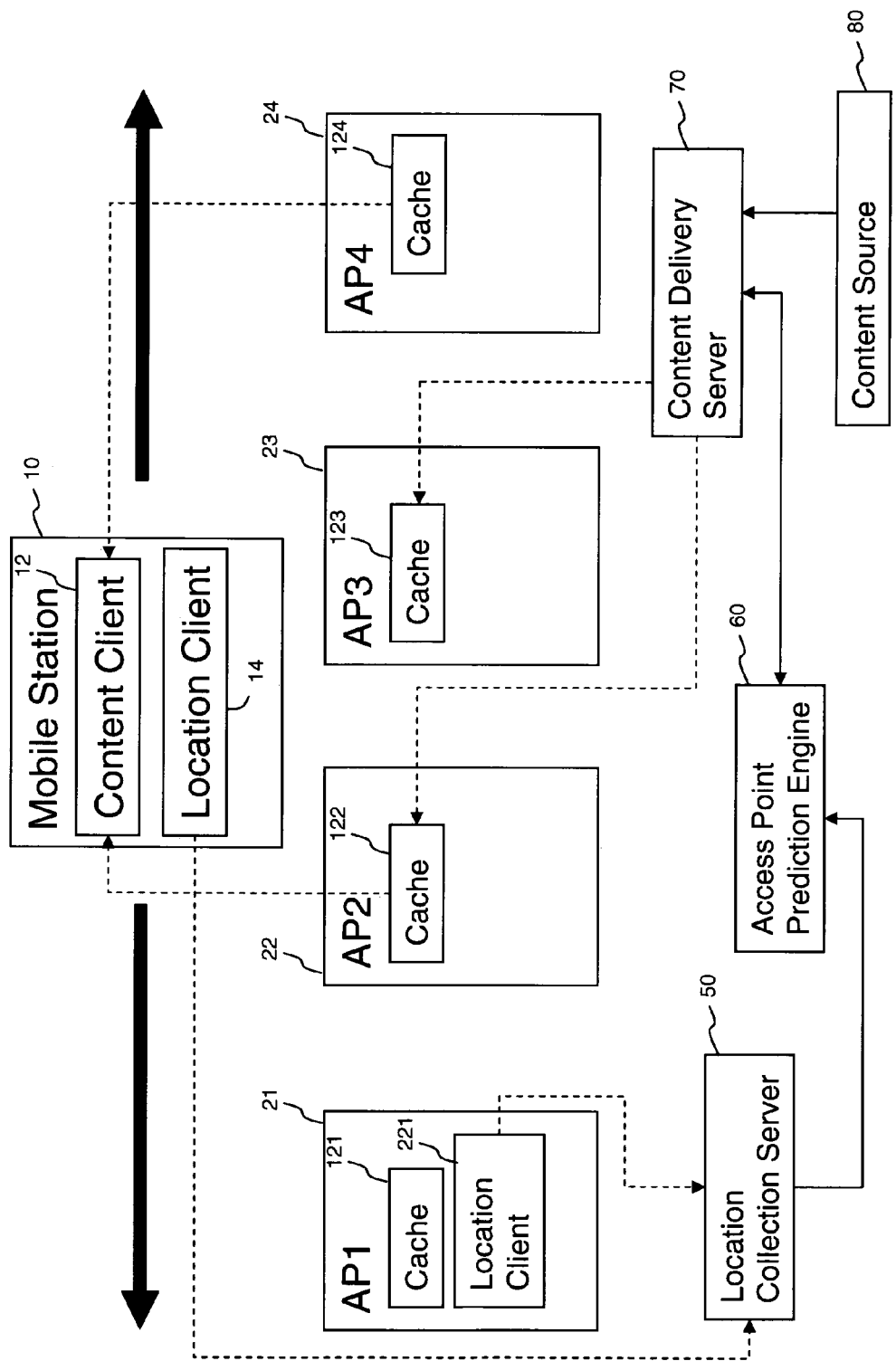
FIG. 2 is a block diagram showing further details of the mobile device and the access points of FIG. 1 together with the main functional modules of a content delivery apparatus according to an embodiment of the present invention.

FIG. 2 is a block diagram illustrating the important functional components of the content delivery system. These include the mobile station 10, Access Points (AP's) 1-4, (indicated by reference numerals 121-24), a Location Collection Server 50, an Access Point Prediction Engine 60 and a Content Delivery Server 70, as well as a content source 80. The mobile station 10 includes a content client module 12, which co-ordinates the downloading of content to the mobile device for consumption by the device's user, and a location client 14 which co-ordinates the transmission of location related data to the Location Collection Server. Each Access Point (21, 22, 23, 24) includes a cache (121, 122, 123, 124) which stores content which has been sent to it by the Content Delivery Server 70 for onward transmission to the mobile station 10 when (or if) it comes into range. FIG. 2 also illustrates the first Access Point (AP1) as including a Location Client module (121), though this is only relevant for an alternative embodiment in which Access Points, instead of, or in addition to, mobile devices, may contact the Location Client Server to provide information about mobile devices currently in range thereof (on behalf of the mobile devices), in which case such access points include a location client module such as location client module 121 which are similar to the location client module 14 in the mobile station 10 (note as an alternative, each access point could include such a location client in which case the mobile stations need not have a location client themselves at all).

In overview, the system operates as follows: the mobile station 10 (or Access Points on behalf of the mobile station)

contacts the Location Collection Server 50 from time to time to provide it with information about its position (if this is known to the device (e.g. because of user input or because the device incorporates a location detector such as a GPS module)) and/or about the base stations with which it is in range (including both GSM base stations and WLAN Access Points). From this information, the Access Point Prediction Engine 60 builds a model of the manner in which each mobile station forming part of the system tends to move through particular access points and base stations. Once the model has been built, the Content Delivery Server 70 provides a service to content providers (indicated by content source 80) for trying to distribute content to a mobile station via WLAN access points. In overview, this is achieved by querying the Access Point Prediction Engine for predictions as to which Access Points the mobile station is likely to transit through and at what times and for how long. Based on these predictions and the Content Delivery Server's knowledge of the approximate rate at which data can be transmitted to each Access Point over the "backhaul" connection, the Content Delivery Server 70 divides the content to be delivered to the mobile station into blocks and sends these to all access points for which there is a reasonable probability of the mobile station coming within range of in the reasonably imminent future.

Figure 3:
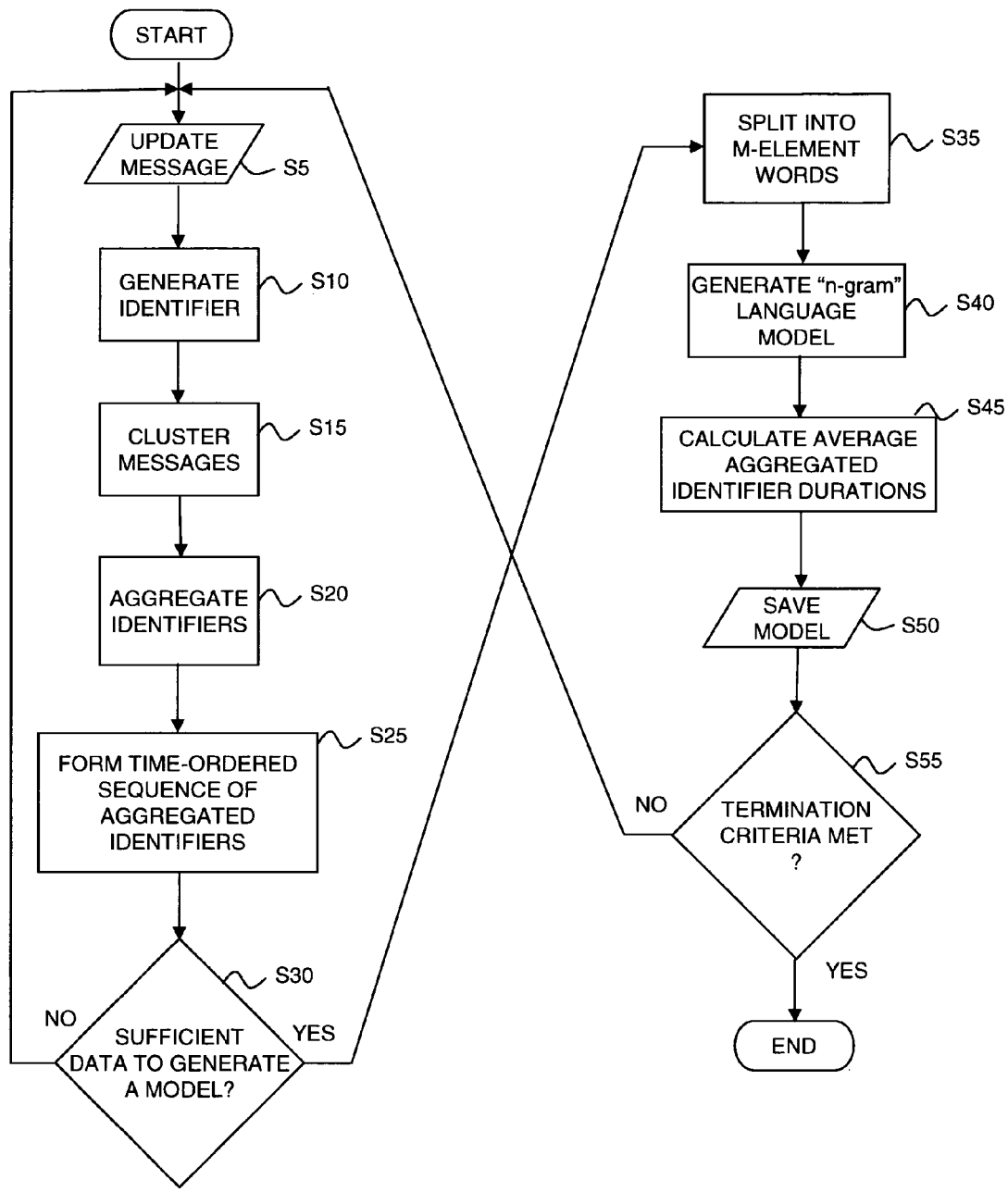
FIG. 3 is a flow chart of the steps performed, by the Access Point Prediction Engine illustrated in FIG. 2, in generating an n-gram language model for use in predicting future access point visibility of devices based on their recent history.
Figure 4:
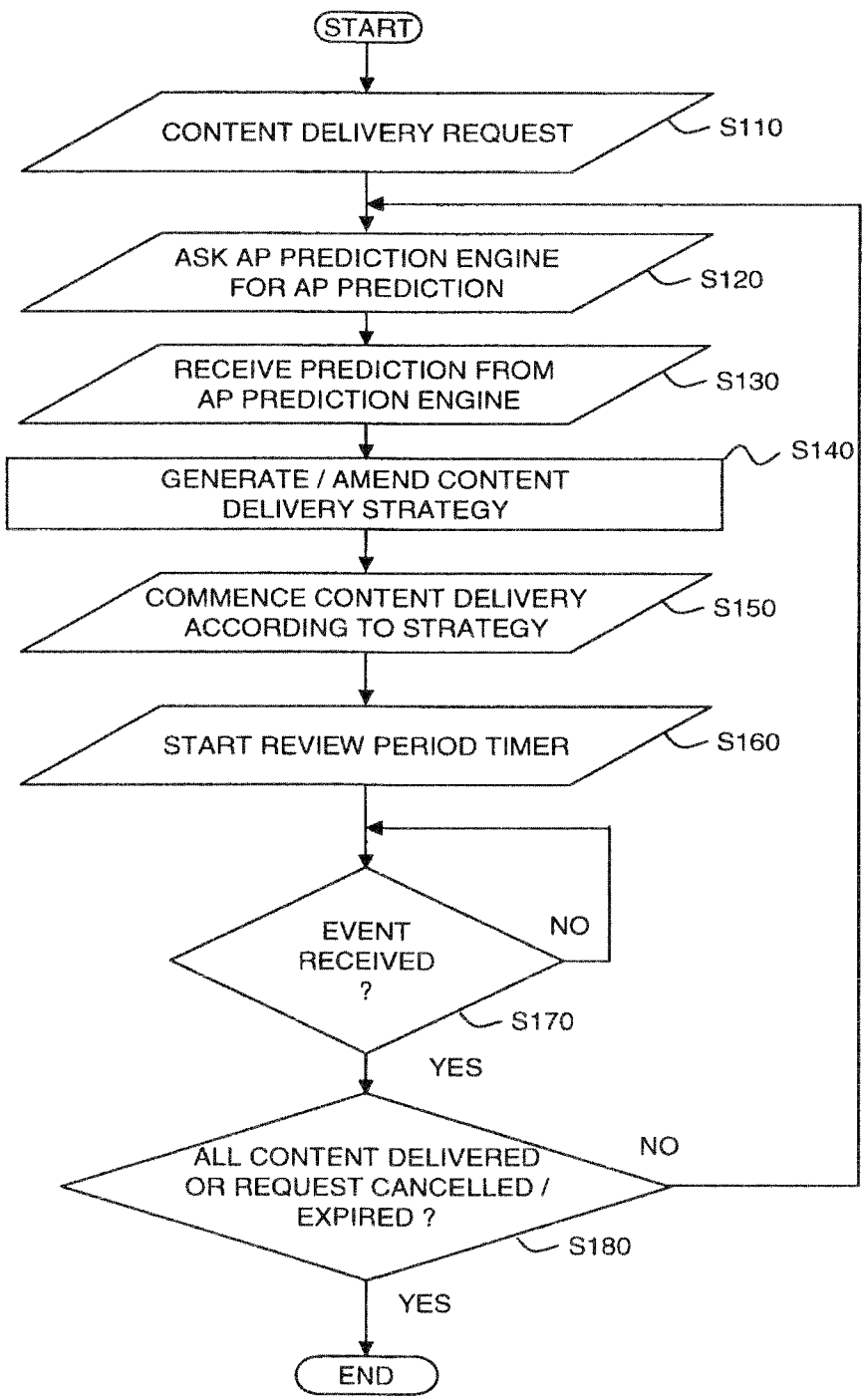
FIG. 4 is a flowchart of the steps performed by the Content Delivery Server illustrated in FIG. 2 in delivering content to a mobile device via Access Points.
Figure 5:
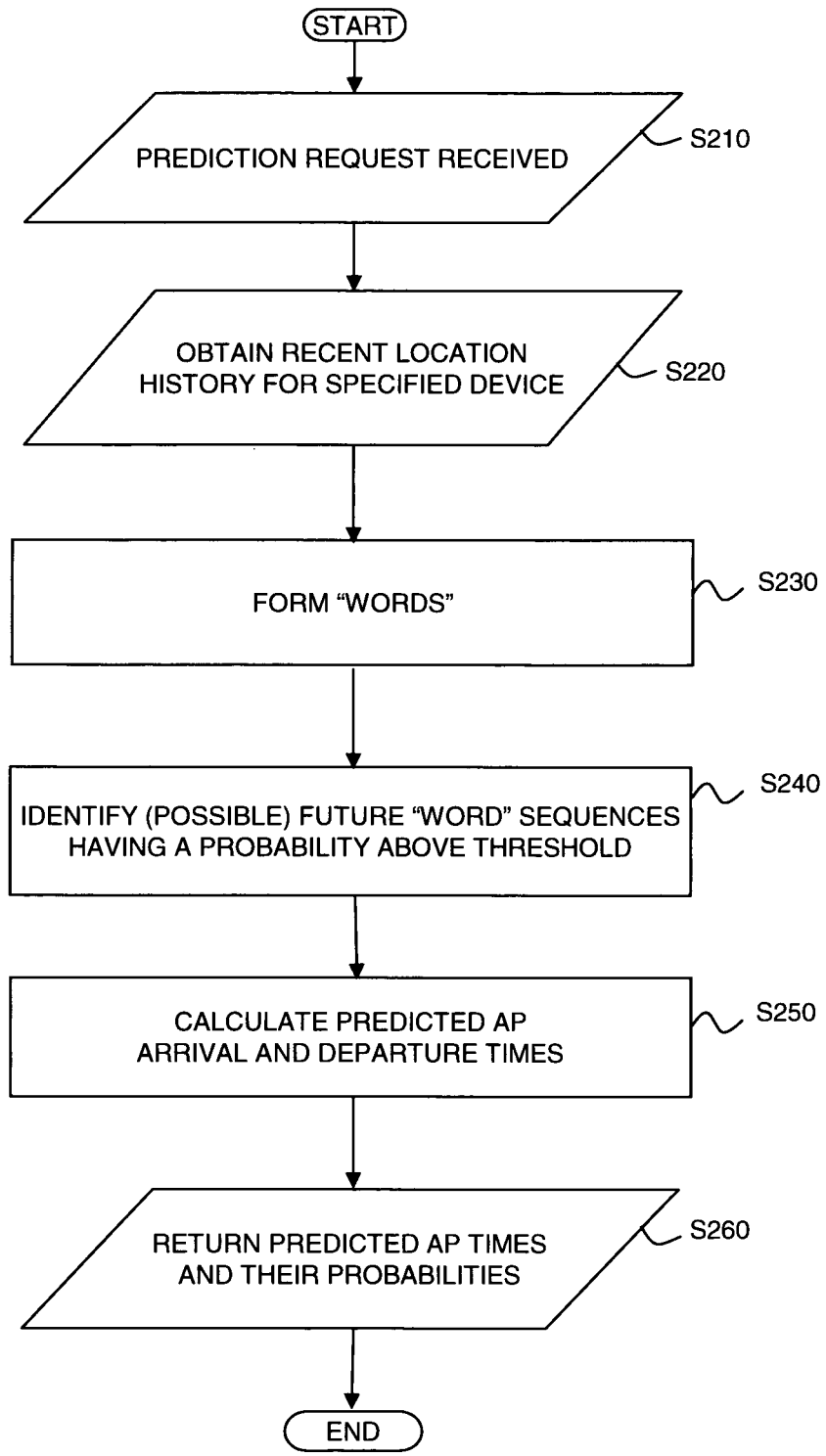
FIG. 5 is a flowchart of the steps performed by the Access Point Prediction Engine in predicting future access point visibility for a specified mobile device based on the recent history of the specified device.

The particular ways in which the above described overview of operation of the system is implemented in the present embodiment is now described with particular reference to FIGS. 3 to 5. FIG. 3 illustrates the steps carried out by the Location Collection server 50 and the Access Point Prediction Engine 60 in generating a model for subsequent use in predicting AP's that a mobile station will come in range of based on its immediate location history.

As mentioned above, the terminal 10 sends location update messages to the location collection server 50 from time to time. If the client is out of WLAN communications range, it may save the messages and send them as a batch when in range of an AP. Alternatively it could send the updates over a wide area network such as GPRS (over GSM).

As mentioned above, the handset could be GPS enabled, or could automatically determine its location through triangulation techniques using, for example, WLAN access points and/or GSM base stations having known reference locations or it could simply request a user to enter location details in order to provide a location estimation; however, if the device is unable to determine a location estimation itself, it still sends location update messages only without a location estimation (see below). Also as mentioned above, in an alternative implementation of phase 1, the access points themselves (or an access point controller for a local network of access points) could detect the presence of the terminal and send the location updates to the location collection server directly; in this case, each AP obtains an indication from each terminal as to the signal strength which it is receiving from the AP (this information is normally made available to the AP in any event as part of the WLAN wireless protocol) and also includes this information in each location update message. (See Cisco http://www.theregister.co.uk/2005/05/05/cisco_wi-fi_tracking_kit/.)

In the present embodiment, each location update message includes the following data elements: Date and/or time; Unique user/mobile terminal id; Geographic location estimate (if available); identifier(s) of one or more visible GSM Base stations and/or WLAN Access points (in respect of AP's the SSID and/or MAC address could be used as identifiers, though SSID's if used without a corresponding MAC address must be treated with care (and preferably with some additional information) since these need not be unique); the signal strength of each visible GSM Base Station and/or WLAN Access Point; and the speed and direction of travel of the device (if available).

Note that the model forming phase can be thought of as comprising two portions, a first portion in which the location update messages are pre-processed (into a form suitable for use in model generation and subsequent prediction forming based on the formed model) and a second portion in which the pre-processed data is then used to form the model. In the present embodiment, the pre-processing portion (which comprises steps S10 to S25) is performed by the location server 50 while the model formation itself (which comprises steps S35 to S45) is performed by the Access Point Prediction Engine 60.

In the present embodiment, the location collection server caches a relatively small amount of the most current processed data. Therefore, since a relatively large amount of data is required to build a useful model, in the model building phase, the AP Prediction Engine obtains all of the processed data for the respective mobile station (10) and stores this, itself, until such time as it has accumulated enough data to build an actual model (step S30) (NB in the present embodiment the AP Prediction Engine treats the inputs from each user separately, however, in future embodiments, there may be options for sharing data between individuals to obtain group models). However, if the AP Prediction Engine is no longer building or updating a mobile device's model, then the location server does not automatically send all (post-processed) location data on to the AP Prediction Engine, but instead only sends a small amount of the cached recent history upon an explicit request from the AP Prediction Engine (it does this in order to make a prediction as explained below).

Thus, in the pre-processing portion, the following steps are taken (after receipt of a location update message in step S5) by the Location Collection Server in order to pre-process the data into a suitable form from which to generate a model. Firstly an identifier is constructed (step S10) by concatenating the strongest GSM base station identifier and the strongest WLAN access point identifier (Note that, as is well known in the art, GSM mobile devices (and other cellular telephones) and 802.11 WLAN enabled devices (and other wireless devices) tend to include a Received Strength Indicator (RSSI) circuit which can be used to determine the strength of a received signal coming from an access point or a GSM base station, etc.). If no WLAN access point or GSM base station is present, the corresponding identifier slot is replaced by "not-present".

As an example, a GSM identifier 3188.20973 could be concatenated with a WLAN MAC address 0011F5-1 DED2B to give a location identifier of "3188.209730011F5-1 DED2B", so a sequence of these identifiers might look like this: 3188.20973not-present 3188.20973not-present 3188.20974not-present 3188.20974not-present 3188.20973not-present 3188.209730011F5-1DED2B 3188.209730011F5-1 DED2B 3188.209740011F5-1 DED2B).

For each unique identifier, where latitude and longitude information is available, the points are clustered (step S15) based on the lat and long and velocity (note, if the location update messages (especially the current and preceding messages) include positional information but not velocity information, the location collection server 50 calculates an estimate of the velocity automatically and adds this information to each update message before performing clustering). The algorithm, used to perform the clustering (which in the present embodiment is the MinClue algorithm of Yu He and Lihui Chen described in their paper entitled "MinClue: A MST-based Clustering Method with Auto-Threshold-Detection" which is currently accessible at http://www.cs.uvm.edu/~yhe/papers/cis04_sep22_2004.pdf) selects the number of clusters to split the data into depending on the natural configuration of the data. Note that in order to perform the clustering, a certain minimum amount of data points are required—thus when the location server first starts observing a new identifier for a particular mobile station it stores all data associated with the corresponding location update messages until it has acquired enough to do some useful clustering; once clustering has been performed, however, only the boundaries of the clusters need be stored and subsequent update messages can be easily assigned to their respective cluster based on these stored boundaries without having to perform a re-clustering on each occasion that a new update message is received.

The unique identifier is then extended by concatenating digits representing which cluster (if any) it fell into. All data that have no associated latitude and longitude (or other location descriptors) are put into a separate cluster represented by the digit "0". A lat/long and velocity mean and covariance are calculated for each cluster. The purpose of this procedure is to enable subsequent stages to distinguish between cases where the user is broadly stationary in an area, passing through an area, or whether there are several distinct physical areas covered by the relevant access points/base stations.

A "re-clustering" process may take place at this point to aggregate identifiers where the strongest received GSM cell id or WLAN AP MAC address is varying due to random effects such as cell breathing, but where the user's location is not changing significantly. In such cases, in the present embodiment, the "minority" messages are mapped to the identifier associated with the "majority" messages (as an alternative, new identifiers could be issued to both types of message) and the mapping from the location update message info to the "majority" (or new) identifier is recorded for future use in pre-processing subsequent received update messages. Thus this re-clustering classifies messages containing different GSM cell id or WLAN AP MAC addresses to the same identifier (as opposed to the above described clustering process which classifies messages having the same GSM cell id and WLAN AP MAC address information' into different identifiers).

Having performed this clustering (and re-clustering) (step S15) the identifiers are then aggregated (step S20) by replacing consecutive entries having the same (now extended) identifier with a single entry. Furthermore, in the present embodiment, even in cases where there is an identifier appearing on its own in the sequence, such singleton identifiers are also converted into "aggregated" identifiers (though of course in this case no actual aggregation is performed). The reason for this is so that each aggregated identifier includes a start and end time, rather than the single point in time associated with individual update messages. In the present embodiment, a start time for each aggregated identifier is defined as the time associated with the identifier preceding the first (or only in the case of singleton identifiers) identifier of the aggregated identifier and an end time of the aggregated identifier is defined as the time associated with the last (or only in the case of singleton identifiers) identifier of the aggregated identifier. In this way, each aggregated identifier also has an associated duration (which may be obtained by subtracting the aggregated identifier's start time from its end time).

Upon completion of the aggregation step (S20) the method proceeds to step S25 in which a time-ordered sequence of aggregated identifiers is formed. During model building this information is, regularly forwarded to the Prediction Engine 60 for further processing (e.g. every time an aggregated identifier is formed or updated—note that as a sequence is being built up with newly incoming information, the final aggregated identifier in the sequence may stay constant with only the end time of the aggregated identifier changing as new update messages are received until a transition to a new identifier occurs). The location collection server only stores a sequence of up to a certain length (e.g. 100 aggregated identifiers in one example implementation) and once the sequence reaches this length, the oldest (i.e. the earliest) stored transitions at the beginning of the sequence are deleted to maintain the sequence length at its maximum length.

It will thus be apparent that during the model-building phase, the Prediction Engine 60 is regularly receiving aggregated identifiers. It uses these to build up its own time ordered sequence of such aggregated identifiers and each time it receives a new or updated aggregated identifier from the Location Server, it evaluates, in step S30, if there is sufficient data available to generate a useful model. The exact criteria used to determine this can be adjusted on a case by case basis, but in the present example implementation the number of aggregated identifier transitions is compared with a threshold minimum number (which is set to 500 in the present embodiment) and a negative determination is made if the number of aggregated identifiers is less than this threshold minimum number. If a negative determination is made in step S30, then the method returns to step S5 to await receipt of a further update message. If a positive determination is made at step S30, then the method proceeds to step S35.

At step S35, the sequence of aggregated identifiers (for a respective mobile station 10) is split into segments of k aggregated identifiers (where in the present embodiment k equals 4). For the sake of clarity, an analogy can be made with letters and words thus: if the aggregated identifiers are considered to be "letters", step S35 can be considered as splitting the sequence of "letters" into a sequence of 4 letter "words". Each "word" then represents a route segment. In the present embodiment, from a particular sequence of aggregated identifiers, each of the n different ways of partitioning the sequence into "words" is used to generate n different "word" sequences (e.g. the sequence ABCDEFGHIJK, would generate the following word sequences {(ABCD, EFGH, IJK), (A, BCDE, FGHI, JK), (AB, CDEF, GHIJ, K), (ABC, DEFG, HIJK)}).

Upon completion of step S35, the method proceeds to step S40 in which the AP Prediction Engine 60 now generates an "n-gram" "language" model (see speech recognition literature such as W3C's n-gram specification currently available at http://www.w3.org/TR/ngram-spec/ and a thesis by Ben Wong entitled "Bigram Model Generalisation Using Singular Value Decomposition", which is currently available for downloading from the Internet at http://www.mcs.vuw.ac.nz/comp/graduates/archives/msc/BenWong.ps.gz., for details on how the bi-gram language model operates (i.e. with n=2)). In the present embodiment a bi-gram model is used (though it will be apparent to persons skilled in the art that any value of n could be used other than two if there were sufficient training data available). This "language" model represents the probability that any given "word" (i.e. route segment) follows a given sequence of other "words" (i.e. route segments), or, in the case of the bi-gram model of the present embodiment, the probability that any given "word" follows a given preceding single "word". This model is likely to be a sparse model. Only transitions seen sufficiently frequently are explicitly modelled, while rare or unseen transitions are modelled by a back-off procedure which decreases the size of the preceding context (see the discussion of "smoothing" in Ben Wong's thesis).

(Note that in the present embodiment only a single model is formed in respect of each mobile station. However, in alternative' embodiments, if sufficient data were present for training, multiple n-gram models could be trained by splitting the initial data into multiple data sets according to, for example, one or more of the following conditions:
  Whether or not it is a working day
  Whether it is am or pm
  The particular day of the week
  The hour of the day—or similar quantisation of the time of day)

Now, using the timing information in the source data, average aggregated identifier durations are calculated (step S45) for each aggregated identifier in each word (i.e. if the word ABCD occurs 4 times in the whole sequence then the average of the durations associated with aggregated identifier A in each of the 4 occurrences of the word is calculated and stored for future use).

Upon completion of step S45, the method proceeds to step S50 in which the various sequences, probabilities and average durations are stored so that the model can subsequently be updated and/or used to perform predictions.

Upon completion of step S50, the method proceeds to step S55 in which a termination criterion is evaluated (in the present embodiment, the termination condition evaluates whether an additional 50 aggregated identifiers have been added to the overall sequence and if so, whether the variance of the observed word transition probabilities has altered by less than a threshold amount in which case it is assumed that the model is mature and will not change significantly with further observations.

Note though that if processing and memory resource are not an issue, it may be desirable to omit this step altogether and permanently update the model. This can either be done on a cumulative basis where new information adjusts the model parameters by an amount which diminishes as the amount of information reflected in the model grows (to keep the influence of each piece of information proportionate); alternatively, the Prediction Engine could maintain a finite length sequence for modelling purposes (somewhat greater than, but otherwise similar to, that maintained by the location collection server) by expiring observed transitions from the beginning of the sequence as new ones are added to the end of the sequence and continuously re-calculating the model based on the current sequence so that the model stays current—this is useful if a user has a significant change of circumstances resulting in a fundamental change of travel patterns which renders the old information useless).

Assuming, however, that step S50 is being performed, if the termination criterion is matched, then the method ends, otherwise the method returns to await a new update message at step S5.

It should also be noted that even if further training is ceased after a certain point in time (because a termination criterion is deemed to have been met in step S55), the Location Collection Server 50 continues to receive update messages from mobile devices (10) and continues to process these update messages to generate aggregated identifiers and to maintain a sequence of these, so that the most recent aggregated identifiers in the sequence can be provided on request to the AP prediction Engine (which then uses this information when making an AP prediction as described below with reference to FIG. 5).

This completes the description of the phase 1, model training phase of operation of the AP Prediction Engine. (Note that model training/updating can continue to run in parallel with phase 2—using the model—although naturally phase 2 cannot start running until a model has been generated.)

Referring now to FIGS. 4 and 5, phase 2, the content delivery phase, of the system is now described.

FIG. 4 details the steps performed by the Content Delivery Server 70 in order to deliver some content to mobile station 10. Thus at step S110 the process commences with a request received by the Content Delivery Server 70 to deliver some content to the mobile station 10. Note that the content request could have been originally initiated either by the client requesting a piece of content (which request could be issued to Content Source provider 80 which then generates its own request to the Content Delivery Server together with the requested data) or by the content delivery manager deciding that it wants to push content to the mobile station without having received an explicit request from the mobile station 10. As a further alternative, the mobile station 10 could send a request for delivery of content directly to the Content Delivery Server itself, in which case the content Delivery Server must then send out a further request (e.g. over the Internet) for the requested content.

In any event, immediately upon receipt of the content delivery request at step S110, the method proceeds to step S120 in which the content delivery server issues a request to the AP Prediction Engine for a prediction about which access points the mobile station 10 will come into range of in the near future. (After this (or in parallel with this, in a multithreaded system), in cases where the data has not already been supplied to the content delivery server for delivery e.g. where the mobile station user has issued an HTTP GET request which has been transmitted to the content delivery server to act as a proxy web server the content delivery server issues requests for the actual content to be delivered and places it into a suitable cache, whilst awaiting a response from the AP Prediction Engine (step S130)).

At step S130 the Content Delivery Server receives back from the AP Prediction Engine a prediction of which Access Points the mobile station 10 will come into range of in the near future, together with expected arrival and duration times for each such AP. The steps taken by the AP in order to make this prediction are described below with reference to FIG. 5.

Once the prediction has been received from the AP Prediction Engine (at step S130), the Content Delivery Server generates a content delivery strategy; this basically involves determining what data it should send to each AP into range of which the prediction predicts that the mobile station will come. To do this, it firstly determines how much data it can send to each of the access points in the time available (given an estimate of how quickly data can be downloaded over the backhaul to the AP—in the present embodiment this estimate is made by periodically testing the connection by measuring how long it takes to fully transmit a test file of known size to each respective AP and storing this result), and how much it expects the mobile station to be able to download from the hotspot given how long it will be there for (and an estimate of the speed at which data can be downloaded to the mobile station over the WLAN connection—for this purpose, each AP, in the present embodiment, keeps a record of the average speed of connection of all WLAN connections it establishes with WLAN enabled devices and periodically transmits this to the Content Delivery Server 70), and notes the minimum of each of these figures for each hotspot (i.e. Access Point).

The content delivery engine then divides the content into blocks and starts downloading sets of blocks of the content to the access point caches in dependence on these estimates: In the present embodiment, the prediction may include multiple different possible routes (preferably limited to a maximum number which in the present embodiment is set to 3) and will devise and start to implement strategies for all such multiple routes (as an alternative, the prediction could include probabilities reflecting the prediction engine's confidence in each particular predicted access point actually being visited and the content delivery server then uses this information in its strategy formation).

In the present embodiment, two different types of mechanism are used for dividing a piece of content into blocks. If the content is such that the entirety of the content needs to be downloaded before it has any real utility (e.g. computer programs), then an erasure code (e.g. the well known Reed Solomon code) is used to generate the content blocks. If the content is such that it has utility even if only part of the content is successfully downloaded (e.g. a piece of streaming media or a lengthy document) then it is formed into chunks which can be viewed individually as well as being recombined with additional chunks as they become available—several protocols exist for this purpose such as Real Time Protocol for transmitting streaming media, or are straightforward to develop in respect of a particular type of file if necessary. If no mechanism is available for dividing a particular large data file into smaller parts which can be processed/viewed independently by the user of the mobile station 10, then, in the present embodiment, the data file is divided using an erasure coding technique.

Once a suitable strategy(ies) has (have) been developed in step S140, the method proceeds to step S150 in which the content delivery server starts to download data blocks to the predicted Access Points and then (at step S160) it also initiates a review period timer (which, in the present embodiment is set to two minutes). Meanwhile, the content delivery server 70 continues to download content blocks to the access points in accordance with its strategy(ies).

As the mobile station 10 reaches each access point with cached content, it downloads the content blocks and starts to reassemble them (into the correct order if necessary) and, if they are streamable, it may also start to stream the data to the user (e.g. playing a video or audio media presentation). Additionally, as the content blocks are received, the mobile station 10 reports back to the content delivery server 70 which blocks it has received. Furthermore, as content blocks are downloaded from the access point, the access point marks these blocks as available for overwriting (unless they also happen to be needed by other mobile devices).

Meanwhile, the content delivery server 70 waits (at step S170) for an event to occur. Such an event could be the review timer timing out, or a notification from the mobile station about one or more blocks having been received, or a notification from the original request sender that the request has now changed (e.g. been cancelled or superseded by a new request for different content).

When an event has been received, the method proceeds to step S180 in which the content delivery server 70 evaluates whether the request is now either completed (i.e. the mobile station has confirmed receipt of all blocks or at least sufficient blocks to recreate the entire requested piece of content) or expired (in the present embodiment requests time out after 8 hours unless explicitly re-requested) or cancelled. If none of these has occurred (i.e. the request is still live and the mobile station has not yet reported that the content has been received in its entirety, then the method returns to step S120 and a new prediction request is issued to the prediction engine.

Thereafter steps 120 to 180 are repeated until a positive determination is made at step S180 whereupon the method ends, except that in step S140, instead of creating a new strategy, the existing strategy is amended to take into account any new information (e.g. about the predicted AP's). Furthermore, if any block of data has been sent to more than one access point, any access points which have received a duplicate copy are informed if the block has already been successfully received by the mobile station so it can mark its duplicate copy as available for overwriting (again, unless it happens to also have been requested by another mobile device). Similarly, as soon as a request is cancelled or expires, the AP's which have cached data for that request are again informed by the content delivery server that the request has expired and so they can mark the data as available for overwriting unless it is also needed for another purpose.

Thus, to summarise, the content delivery server periodically checks on the progress of the download, and requests updated predictions on the mobile station's location. In the light of this, it revises its choice of which content to send to which caches and deletes data from caches where it no-longer requires the data to be stored. This process continues until the data has been downloaded to the terminal, at which point the caches can be cleared (assuming the data isn't required for other users).

The steps performed by the Access prediction Engine 60 in order to process a request for a prediction are now described with reference to FIG. 5. Thus, upon receipt of a prediction request at step S210, the AP Prediction Engine 60 obtains (at step S220) the recent location history for the device specified in the prediction request, from the Location Collection Server 50 (although shown as one step, it will be appreciated that this actually involves sending a request to the location collection server and receiving a response back therefrom; however, the request is given high priority by the location collection server so in practice the response is sent very quickly after receiving the request also note that if the AP Prediction Engine is still updating the model for the mobile station 10, then it will already have access to the latest location information in its maintained sequence of identifier transitions for the device and so it will not, in this case, need to contact the location collection server at all).

Then at step S230, the identifier transitions are classified into words (note in the present embodiment, the location history provided by the location server takes the form of the four most recent aggregated identifiers and so this step is totally trivial as the presented information is a single complete word; furthermore, in different embodiments using words of different lengths, although correspondingly more or fewer aggregated identifiers would be provided, the step would still be trivial as enough would be provided for a single word only. However, if a tri-gram (or greater) model were being used, then two (or more) "words" would need to be provided instead of the single word required in the present bi-gram model embodiment in which case this step would be required to divide the provided sequence of identifiers at the correct place (or places)).

After step S240, the model is now "searched" to determine the most likely "word" sequences to follow the observed word sequence. Only predictions above a specified threshold probability are accepted. Then for each predicted "word" sequence (and the current location) the "words" are searched to see if they contain any identifiers that indicate that WLAN availability is expected.

Where WLAN availability is expected (or present) the timing information stored with the n-gram model is examined, at step S250 to determine when the mobile station can be expected at that hotspot, and how long they are expected to remain there. 11. These predictions are then sent back, at step S260 to the content delivery engine 12, and then the method ends.

Note that in the present embodiment the model predicts only one word ahead (though it may suggest several possibilities for this subsequent word). To predict further ahead than this, the output from a first stage of prediction is fed as the input to a subsequent stage and in this way the prediction can be moved further into the future. However, since a cut-off probability is employed beneath which results are not reported back, the process will tend to come to an end in a reasonable amount of time. e.g. if a 5% threshold is set, and the "word" ABCD is fed as the input (suggesting that the most recent identifier is identifier D) then if the model indicates that there is a 30% chance of the next "word" being EFGH and a 20% chance of the next "word" being EFEF (with all other possibilities having less than 5% probability, then the model can be examined once more using EFGH as the input; if this produces a 30% chance of being followed by IJKL (giving a combined probability of arriving at IJKL of 30%*30%=9%), if there are no subsequent words from IJKL with a probability of greater than 50% then clearly this is as far as the model can progress along this possible line; similarly, starting from EFEF might yield no subsequent "words" having a probability greater than 25% and so again EFEF is as far as the model can progress along that line, etc.

Variations

As mentioned above, there is considerable flexibility as to various parameters used in the n-gram model, especially the size of the "words" which can vary from just one "letter" to an arbitrarily high value, although values above 10 are unlikely to be very useful in real circumstances since the amount of data required to train a model using words of this size would be very high indeed. Also, the number of "words" used in order to make a prediction (e.g. bi-gram, tri-gram, . . . n-gram) can also vary from 1 (bi-gram) to an arbitrarily high number although again values greater than 10 are unlikely to be very useful in real circumstances since the amount of data required to train a model using words of this size would be very high indeed.

Also note that when there is no previously seen occurrence of a particular "word" and so the model has no explicit knowledge of which transitions from this "word" are more or less likely, it may be appropriate to use a simple frequency distribution of previously observed words (roughly equivalent to a uni-gram model). However, it would be preferred to try to estimate the current location of the device and to assign a probability to AP's based on their estimated proximity to the estimated current location of the mobile station, where this information is available. An even more preferred solution however, is to use a general population model. That is, when an individual's model has no previously seen occurrence (or very few) of a particular "word" but a general population model built up from the combined observations of all users monitored by the system does have knowledge about transition's from the target "word", then the general population model is used instead of the current user's individual model.

An alternative function which may be performed in an alternative embodiment of the present invention allows a mobile station having data to upload to make use of the access point caches (i.e. the mobile station uploads its data to these mobile caches), which then more slowly "trickle" the data on to the content delivery server 70 over the backhaul. In this case the mobile station simply sends the data to the cache as fast as it can when it's in range. The content delivery server 70 contacts the mobile station 10 (either via an AP or via the WAN access) whenever it receives a block of content and the mobile station keeps a record of which data has been sent and received by the content delivery engine. (It may possibly send the data more than once, if a cache it has used has a particularly congested backhaul.)

In a further alternative embodiment, the location prediction function is extended by using calendar information where calendar information is available for the user. In this embodiment, associations are made between the textual location field in calendar appointments and geographic locations (or the base station/access point location contexts as described above). This can be done manually by a user or automatically or a combination of both. In the case of manual association, this is most preferably implemented simply by having the user click a button to confirm that they are in the location specified in the current calendar appointment. In this case, a signal is sent to the location prediction engine, which records an association between the current location identifier and the text of the appointment location. In automatic association the location identifiers are sent to the location collection server as in the main embodiment. The location prediction engine then accesses the user's calendar and examines the calendar for any appointments at the current time where it does not yet have an association for the location text found in the calendar for the current time with location identifiers. If it detects such a location, it requests location updates for the user's device for the period of the appointment.

Whichever method is used (i.e. manual or automatic) the prediction engine then creates the location identifiers as per the main embodiment, and creates a histogram of the identifiers associated with that location. The identifiers associated with the top x % of the histogram distribution are registered together with their corresponding probability. The above process is repeated for the first n times that the user has a diary entry at that location. After this point the location association is considered as having been trained. (It would be possible to continuously update this association, and put in place procedures to take account of missed appointments.)

Having trained the system to associate calendar locations with access point identifiers, access point predictions are made taking into account both the calendar information and the access point/cell id information as described below. When an upload request has been made, the prediction engine requests the location history from the location collection server and also looks at the user's diary to see whether any appointments that are current or are in the near future have locations registered for which AP associations have been made as described above. If no registered locations are discovered, location prediction is carried out as per the main embodiment. Alternatively, if one or more registered locations are discovered then the following steps are followed in addition to the steps of the main embodiment, to provide supplemental access point predictions.

If the registered location has an associated WLAN access point, then that access point is added in to the list of predicted access points for the duration of the meeting. Additionally, the n-gram "word" model is used in reverse to predict the most likely route segments used to reach the appointment location. If any of these segments have associated WLAN access points, these are added to the list of predicted access points, with timings derived from the start time of the meeting less the route's associated duration.

In a further variant, the content delivery server 70 can modify the figures it obtains from the AP prediction engine when determining its strategy (or strategies) in such a way as to include a significant margin for error. In brief it assumes for the purposes of deciding how much data to send to each AP that the AP will be able to send more than the prediction suggests by an amount (say 10%) but for the purposes of deciding what data to send to a subsequent predicted AP that the amount of data actually downloaded to the mobile station at the preceding AP is some amount less than that suggested by the prediction. In this way there will tend to be an overlap and the same data will be sent to both such AP's, but this increases the chances of the mobile station successfully receiving all of the required data.

Instead of using an n-gram model for predicting future possible AP/hotspot arrival and departure times, other well-known machine learning algorithms could be used instead such as artificial neural networks.

As mentioned above, the invention is most suited to situations where there is a high bandwidth short-range communication link between a mobile device and an access point, and a lower bandwidth connection between the access point and the core network from which the user might wish to obtain data, and wherein the mobile device comes into range of an access point only intermittently but where the access points are in pretty much permanent connection with the core network (albeit it at a lower bandwidth). The 802.11 WLAN arrangements tend to fit this profile most particularly and so the present invention is most suited for use with such WLAN's, however, the invention could equally be applied to other similar situations, should they arise in the future. Furthermore, instead of using a wireless short range communication, the invention is equally applicable to situations using a wired connection (e.g. where a mobile device user connects the device to a wired Ethernet LAN on arrival at an Internet café, an office or a friends house, etc. In this scenario the access point at which the required data is pre-cached could include any computer connected to the LAN and the mobile device is considered to come into range of the access point when it connects to the LAN). Furthermore, the invention may also be useful with Wireless Metropolitan Access Network (WMAN) arrangements, especially where the wireless connection is better than the backhaul connection on an individual user basis.

What is claimed is:

1. A computer-implemented method of transmitting data via a core portion of a computer network to a mobile device, the network including a plurality of access points wherein each access point includes a memory where data for onward transmission to the mobile device may be cached and is configured to communicate with the mobile device over a short-range wireless connection, when the mobile device is in range thereof, and with the core portion of the network over a backhaul connection thereto on a substantially continuous basis, the method comprising: obtaining information comprising mobile device's updated physical geographic location and identifiers of currently in-range access points from the mobile device; generating predictions using an n-gram language model of one or more of the access points which the mobile device is considered likely to come in range of in the future based on the obtained information; and transmitting the data or a portion thereof to the one or more predicted access points via the backhaul connection for caching thereat and for onward transmission to the mobile device in the event that the mobile device comes into range of the access point, or one or more of the access points where data is transmitted to more than one predicted access point.

2. The computer-implemented method according to claim 1 further including:
dividing the data to be transmitted into a plurality of blocks of data;
predicting the time at which the mobile device will come in range of a specified access point, and the duration for which the mobile device will stay in range of the access point;
determining an estimate of the number of the blocks to be transmitted that can both be transmitted over the backhaul and onward transmitted over the short-range connection before the mobile device is predicted to move back out of range of the access point; and
transmitting the estimated remainder of the blocks to one or more additional ones of the access points which the device is considered likely to come in range of after moving back out of range of the specified access point.

3. The computer-implemented method according to claim 1, wherein
the short-range wireless connection is a WLAN connection complying with an IEEE 802.11x standard.

4. The computer-implemented method according to claim 2 wherein
the blocks of data are formed using an erasure code.

5. A system for transmitting data via a core portion of a computer network to a mobile device, the network including a plurality of access points wherein each access point includes a memory where data for onward transmission to the mobile device may be cached and is configured to communicate with the mobile device over a short-range wireless connection, when the mobile device is in range thereof, and with the core portion of the network over a backhaul connection thereto on a substantially continuous basis, the system comprising: a location collection server configured to receive information comprising mobile device's updated physical geographic location and identifiers of currently in-range access points from the mobile device; an access point prediction engine configured to generate predictions using an n-gram language model of one or more of the access points which the mobile device is considered likely to come in range of in the future based on the information received at the location collection server; and a content delivery server configured to transmit the data or a portion thereof to the one or more predicted access points via the backhaul connection for caching at the access points and for onward transmission to the mobile device in the event that the mobile device comes into range of the access point, or one or more of the access points where data is transmitted to more than one predicted access point.

6. A content delivery server for use in the system of claim 5, said server being configured:
to divide the data to be transmitted into a plurality of blocks of data,
to determine an estimate of the number of the blocks to be transmitted that can both be transmitted over the backhaul and onward transmitted over the short-range connection before the mobile device is predicted to move back out of range of an access point according to a prediction made by the prediction engine, and
to transmit the estimated number of the blocks to the access point.

7. A location collection server for use in the system of claim 5, said server being configured:
to receive a plurality of location update messages from a mobile device and
to pre-process the update messages to generate aggregated identifiers which replace a plurality of separate update messages with a single combined identifier where it is determined that the location status of the mobile device has not changed significantly for the purposes of predicting the future likelihood of the mobile device coming into range of an access point.

8. An access point for use in the system of claim 5, said access point comprising a cache configured to store blocks of data for subsequent transmission to a specified mobile device should that device come into range of the access point and receive data for subsequent transmission to the mobile device prior to the mobile device being in communication with the access point.

9. A mobile device for use with the system of claim 5, said mobile device being configured to generate location update messages for transmission to the location collection server, each location update message including information about both WLAN access points which it is currently within range of, as well as information about GSM or other cellular base stations which it is currently within range of.

10. A non-transitory computer-readable storage medium storing a program or suite of programs to be executed by a processor or processors to carry out the method of claim 1.

* * * * *

UNITED STATES PATENT AND TRADEMARK OFFICE
CERTIFICATE OF CORRECTION

PATENT NO. : 8,718,670 B2  
APPLICATION NO. : 12/530371  
DATED : May 6, 2014  
INVENTOR(S) : Ringland et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1164 days.

Signed and Sealed this

Twenty-ninth Day of September, 2015

Michelle K. Lee
*Director of the United States Patent and Trademark Office*